United States Patent
Gupta (10) Patent No.: US 6,679,415 B1
(45) Date of Patent: Jan. 20, 2004

(54) FASTENER COLLATION STRIP HAVING MAGAZINE RAIL-ENGAGING MEMBERS DEFINING POINT-CONTACT TIP REGIONS

(75) Inventor: Harish C. Gupta, Naperville, IL (US)

(73) Assignee: Illinois Tool Works Inc., Glenview, IL (US)

( * ) Notice: Subject to any disclaimer, the term of this patent is extended or adjusted under 35 U.S.C. 154(b) by 31 days.

(21) Appl. No.: 10/212,290

(22) Filed: Aug. 5, 2002

(51) Int. Cl.[7] .............................................. B65D 85/24
(52) U.S. Cl. ...................... 227/120; 227/135; 227/136; 227/19; 227/127; 206/345; 206/346; 206/347
(58) Field of Search ................................ 227/135–137, 227/120, 19, 127, 129; 206/345, 346, 347

(56) References Cited

U.S. PATENT DOCUMENTS

| | | |
|---|---|---|
| 3,756,391 A | 9/1973 | Keck et al. |
| 3,927,459 A | 12/1975 | Haytayan |
| 3,954,176 A | 5/1976 | Haytayan |
| 4,106,618 A | 8/1978 | Haytayan |
| 4,560,061 A * | 12/1985 | Haytayan .................... 206/346 |
| 4,718,551 A | 1/1988 | Whitledge |
| 4,932,821 A | 6/1990 | Steffen et al. |
| 5,069,340 A | 12/1991 | Ernst et al. |
| 5,836,732 A | 11/1998 | Gupta et al. |
| 5,865,311 A | 2/1999 | Hentges et al. |
| 5,931,622 A | 8/1999 | Gupta et al. |
| 5,975,399 A * | 11/1999 | Oehri et al. ................. 227/120 |
| 6,044,972 A | 4/2000 | Rohrmoser et al. |
| 6,135,278 A | 10/2000 | Rohrmoser et al. |
| 6,212,980 B1 | 4/2001 | Kratch et al. |

* cited by examiner

Primary Examiner—Rinaldi I. Rada
Assistant Examiner—Michelle Lopez
(74) Attorney, Agent, or Firm—Lisa M. Sottis; Mark W. Croll; John H. Pilarski (57) ABSTRACT

A fastener collation strip has pairs of vertically aligned rail-engaging members or projections which have convergent sides disposed within at least two mutually orthogonal planes such that lower and upper tip regions of the rail-engaging members or projections define point-type contacts whereby the fastener collation strips are movably supported upon the rail members of the magazine section of the fastener-driving tool. As a result of the point-type contacts, frictional forces generated between the collation strips of fasteners and the rail members of the magazine section of the fastener-driving tool are effectively reduced as much as possible whereby the conveyance or transportation of the collation strips of fasteners through the magazine section of the fastener-driving tool is effectively facilitated so as to render the conveyance or transportation of the collation strips of fasteners through the magazine section of the fastener-driving tool as smooth as possible. In this manner, any tendency of the fastener collation strips to become retarded, "hung-up", or jammed within the magazine section of the fastener-driving tool is effectively prevented.

22 Claims, 4 Drawing Sheets

FASTENER COLLATION STRIP HAVING MAGAZINE RAIL-ENGAGING MEMBERS DEFINING POINT-CONTACT TIP REGIONS

FIELD OF THE INVENTION

The present invention relates generally to fastener collation strips, and more particularly to a new and improved fastener collation strip for effectively supporting a plurality of fasteners within a magazine portion of a fastener driving tool in a substantially friction-reduced manner, as the plurality of fasteners are transported or conveyed through the magazine portion of the fastener-driving tool and toward the nosepiece portion of the fastener-driving tool so as to be driven into an underlying substrate by means of a suitable driver mechanism movably disposed within a drive bore of the fastener-driving tool, thereby effectively reducing the risk that the fasteners would otherwise be undesirably retarded or "hung-up" within the magazine, or become jammed within the drive bore of the fastener-driving tool, whereby such malfunctions of the fastener-driving tool would correspondingly lead to an improper and unsuitable discharge of the fasteners from the fastener-driving tool and an undesirably improper insertion of one or more fasteners into the underlying substrate.

BACKGROUND OF THE INVENTION

Fastener-driving tools, which may comprise pneumatically-operated, combustion-powered, or powder actuated tools, are well-known in the industry and are conventionally utilized for driving fasteners, having a point at a first end of a shank portion and a head upon a second opposite end of the shank portion, into an underlying substrate so as to secure a suitable workpiece to or upon the underlying substrate. Typical fasteners may comprise, for example, nails which may be forcibly driven into wood substrates, or drive pins which may be forcibly driven into concrete, masonry, or steel substrates. Typical fastener-driving tools usually comprise a magazine within which fastener collation strips, comprising a serial arrangement of the fasteners, are movably supported so as to convey the serially arranged fasteners from the magazine portion of the fastener-driving tool to a drive bore portion of the fastener-driving tool within which a suitable driver mechanism is movably disposed for impacting a leading one of the fasteners disposed within the collation strip so as to serially discharge the fasteners from the fastener-driving tool. Examples of fastener-collation strips for disposition within magazine portions of fastener-driving tools are disclosed within U.S. Pat. No. 6,044,972 which issued to Rohrmoser et al. on Apr. 4, 2000, U.S. Pat. No. 5,069,340 which issued to Ernst et al. on Dec. 3, 1991, U.S. Pat. No. 4,932,821 which issued to Steffen et al. on Jun. 12, 1990, U.S. Pat. No. 4,718,551 which issued to Whitledge on Jan. 12, 1988, U.S. Pat. No. 4,106,618 which issued to Haytayan on Aug. 15, 1978, U.S. Pat. No. 3,954,176 which issued to Haytayan on May 4, 1976, and U.S. Pat. No. 3,927,459 which issued to Haytayan on Dec. 23, 1975.

Figure 1:
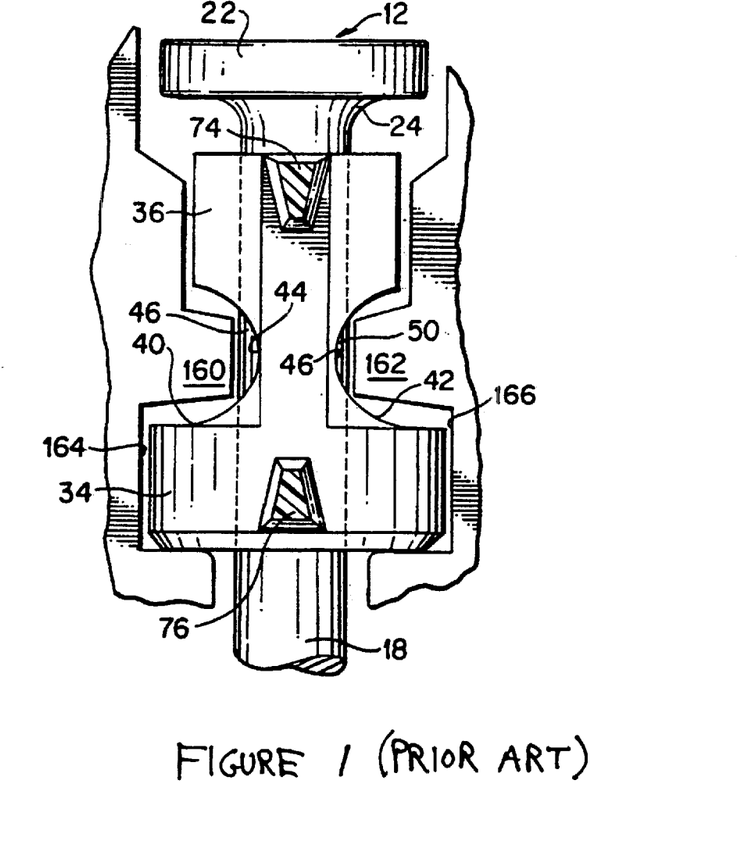
FIG. 1 is a side elevational view of a conventional PRIOR ART fastener collation strip having a fastener disposed therein and mounted within a guiding device of a fastener-driving tool.

With reference being made to FIG. 1, which corresponds to FIG. 17 of the aforenoted Ernst et al. patent, a plurality of fasteners 12, each having a shank portion 18, a head portion 22, and a transition portion 24 interconnecting the head portion 22 to the shank portion 18, are respectively disposed within a collation strip comprising a plurality of sleeve members each of which comprises an upper breakable portion 36 and a lower annular portion 34. Adjacent sleeve members of the collation strip are integrally connected together by means of upper and lower frangible bridge members 74,76, and the axially central portion of each sleeve member comprises a pair of concave recesses 40,42 within which a pair of windows 44,48 are defined and through which shank portions 46,50 are visible. The collation strip is adapted to be movably supported within a magazine section, not shown, of the fastener-driving tool, and the magazine section of the fastener-driving tool supplies the collation strip and plurality of fasteners 12 to a guiding device which comprises grooved portions 164,166 for accommodating the lower annular portion 34 of each sleeve member of the collation strip, and a pair of oppositely disposed rail or rib members 160,162. The rail or rib members 160,162 correspond to similar rail members, not shown, provided within the magazine section of the fastener-driving tool and are adapted to be disposed within the recessed portions 40,42 of the collation strip so as to receive and guide each collation strip of fasteners 12 as the same is moved from the magazine section of the fastener-driving tool and toward the nosepiece section and guiding device of the fastener-driving tool. A driving mechanism of the fastener-driving tool can then impact the first or leading one of the fasteners 12 in order to discharge the fastener 12 from the fastener-driving tool and thereby drive the fastener 12 into an underlying substrate.

While the aforenoted fastener-driving tools have been commercially successful and have performed quite satisfactorily in the field, it is desirable to ensure that, as the collation strips of fasteners are transported or conveyed through the magazine section of the fastener-driving tool and toward the nosepiece section of the fastener-driving tool such that the fasteners can be serially discharged from the fastener-driving tool and driven into an underlying substrate at predetermined locations thereof, the risk of the collation strips of fasteners being undesirably retarded or "hung-up" within the magazine section of the fastener-driving tool, or of becoming jammed within the drive bore of the fastener-driving tool, is effectively reduced. As can readily be appreciated or understood, if any of the collation strips of fasteners do become retarded or "hung-up" within the magazine section of the fastener-driving tool, or do become jammed within the drive bore of the fastener-driving tool, such malfunctions of the fastener-driving tool would correspondingly lead to an improper and unsuitable discharge of the fasteners from the fastener-driving tool and an undesirably improper insertion of one or more fasteners into the underlying substrate. More particularly, it is desirable to effectively reduce, as much as possible, any frictional contact generated between the collation strips of fasteners and the rail members of the magazine section of the fastener-driving tool whereby the conveyance or transportation of the collation strips of fasteners through the magazine section of the fastener-driving tool is effectively facilitated or positively enhanced so as to render such conveyance or transportation of the collation strips of fasteners through the magazine section of the fastener-driving tool as smooth as possible. In view of the fact that the frictional forces, generated between any two members disposed in contact with each other, are directly proportional to the area of contact defined between the two members disposed in contact with each other, it is desirable to effectively reduce the contact area defined between the collation strips of fasteners and the rail members of the magazine section of the fastener-driving tool as the collation strips of fasteners are conveyed or transported along the rail members of the magazine section of the fastener-driving tool.

A need therefore exists in the art for a new and improved fastener collation strip which is adapted to be supported upon the rail members of the magazine section of the fastener-driving tool in such a manner the frictional forces generated between the fastener collation strip and the rail members of the magazine section of the fastener-driving tool will be effectively reduced so as to accordingly ensure that the fastener collation strip, carrying the plurality of fasteners therewithin, is conveyed or transported through the magazine section of the fastener-driving tool with a minimum amount of friction whereby the fastener collation strip does not become retarded or "hung-up" within the magazine section of the fastener-driving tool, or does not become jammed within the drive bore of the fastener-driving tool whereby such malfunctions-within the fastener-driving tool would otherwise correspondingly lead to an improper and unsuitable discharge of the fasteners from the fastener-driving tool and an undesirably improper insertion of one or more fasteners into the underlying substrate.

OBJECTS OF THE INVENTION

Accordingly, it is an object of the present invention to provide a new and improved fastener collation strip for serially conveying or transporting a plurality of fasteners through a magazine section of a fastener-driving tool and toward a driving bore of the fastener-driving tool within which a driver member is movably disposed for engaging the leading one of the plurality of fasteners so as to drive the leading fastener through the drive bore of the fastener-driving tool and into an underlying substrate.

Another object of the present invention is to provide a new and improved fastener collation strip for serially conveying or transporting a plurality of fasteners within a magazine section of a fastener-driving tool and toward a driving bore of the fastener-driving tool wherein a driver member is movably disposed for discharging the leading one of the plurality of fasteners from the drive-bore of the fastener-driving tool and for driving the leading fastener into an underlying substrate, wherein the fastener collation strip has new and improved structure integrally incorporated thereon for effectively minimizing the surface contact area defined between each sleeve member of the fastener collation strip and the rail members of magazine section of the fastener-driving tool as the fastener collation strip is conveyed or transported along the rail members of the magazine section of the fastener-driving tool.

An additional object of the present invention is to provide a new and improved fastener collation strip for serially conveying or transporting a plurality of fasteners within a magazine section of a fastener-driving tool and toward a driving bore of the fastener-driving tool wherein a driver member is movably disposed for discharging the leading one of the plurality of fasteners from the drive bore of the fastener-driving tool and for driving the leading fastener into an underlying substrate, wherein the fastener collation strip has new and improved structure integrally incorporated thereon for effectively minimizing the surface contact area defined between each sleeve member of the fastener collation strip and the rail members of magazine section of the fastener-driving tool as the fastener collation strip is conveyed or transported along the rail members of the magazine section of the fastener-driving tool so as to effectively reduce or minimize the frictional forces generated between the fastener collation strip and the rail members of the magazine section of the fastener-driving tool.

A further object of the present invention is to provide a new and improved fastener collation strip for serially conveying or transporting a plurality of fasteners within a magazine section of a fastener-driving tool and toward a driving bore of the fastener-driving tool wherein a driver member is movably disposed for discharging the leading one of the plurality of fasteners from the drive bore of the fastener-driving tool and for driving the leading fastener into an underlying substrate, wherein the fastener collation strip has new and improved structure integrally incorporated thereon for effectively minimizing the surface contact area defined between each sleeve member of the fastener collation strip and the rail members of magazine section of the fastener-driving tool as the fastener collation strip is conveyed or transported along the rail members of the magazine section of the fastener-driving tool so as to effectively reduce or minimize the frictional forces generated between the fastener collation strip and the rail members of the magazine section of the fastener-driving tool so as to effectively prevent the fastener collation strip from being "hung-up" or becoming jammed within the magazine section of the fastener-driving tool.

A last object of the present invention is to provide a new and improved fastener collation strip for serially conveying or transporting a plurality of fasteners within a magazine section of a fastener-driving tool and toward a driving bore of the fastener-driving tool wherein a driver member is movably disposed for discharging the leading one of the plurality of fasteners from the drive bore of the fastener-driving tool and for driving the leading fastener into an underlying substrate, wherein the fastener collation strip has new and improved structure integrally incorporated thereon for effectively minimizing the surface contact area defined between each sleeve member of the fastener collation strip and the rail members of magazine section of the fastener-driving tool as the fastener collation strip is conveyed or transported along the rail members of the magazine section of the fastener-driving tool so as to effectively reduce or minimize the frictional forces generated between the fastener collation strip and the rail members of the magazine section of the fastener-driving tool so as to effectively prevent the fastener collation strip from being "hung-up" or becoming jammed within the magazine section of the fastener-driving tool whereby improper discharge of the fasteners from the fastener-driving tool and improper insertion of one or more fasteners into the underlying substrate is correspondingly prevented.

SUMMARY OF THE INVENTION

The foregoing and other objectives are achieved in accordance-with the teachings and principles of the present invention through the provision of a new and improved fastener collation strip which comprises a plurality of sleeve members which are integrally connected together in a serial linear array by means of suitably frangible upper and lower bridge portions, and wherein, in accordance with the unique and novel principles and teachings of the present invention, each one of the sleeve members comprises an upper pair of downwardly extending rail-engaging members or projections disposed upon diametrically opposite sides of each sleeve member, and a lower pair of upwardly extending rail-engaging members or projections likewise disposed upon diametrically opposite sides of each sleeve member so as to also be respectively vertically aligned with each one of the downwardly extending rail-engaging members or projections. Each one of the rail-engaging members or projections has, for example, a frusto-conical or frusto-pyramidal geometrical configuration wherein, more particularly, side portions of each rail-engaging member or projection converge toward each other within at least two mutually orthogonally located planes such that the tip portion of each rail-engaging member or projection defines a substantially point-contact region for actually engaging an upper or lower surface portion of each oppositely disposed magazine rail member. In this manner, since only substantially point contact engagement is defined between each one of the rail-engaging members or projections of each sleeve member of the fastener collation strip and each rail member of the magazine section of the fastener-driving tool, frictional forces are effectively minimized so as to accordingly minimize the tendency of the fastener collation strips from being "hung-up" or from becoming jammed within the magazine section of the fastener driving tool.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein.

DETAILED DESCRIPTION OF THE PREFERRED EMBODIMENT

Figure 2:
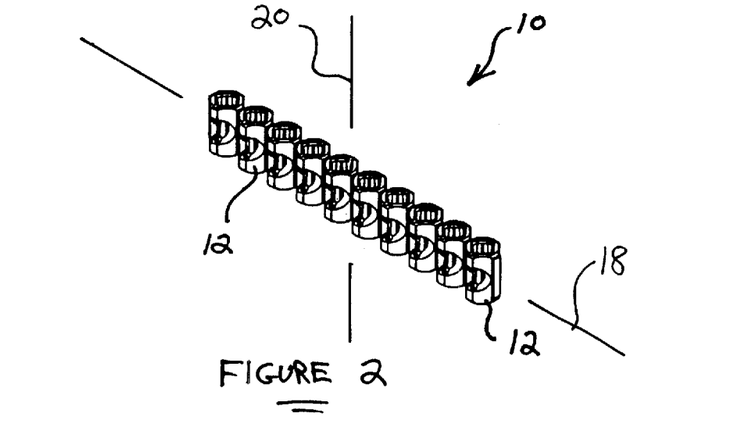
FIG. 2 is a perspective view of a new and improved fastener collation strip constructed in accordance with the principles and teachings of the present invention and showing the cooperative parts thereof.

Referring now to the drawings, and more particularly to FIGS. 2–8 thereof, a new and improved fastener collation strip, constructed in accordance with the principles and teachings of the present invention, is illustrated and is generally indicated by the reference character 10. The collation strip 10 is fabricated from a suitable polymeric material and is seen to comprise a plurality of sleeve members 12 which are arranged within a substantially linear array as may best be appreciated from FIGS. 2, 4, and 5. As can best be further appreciated from FIGS. 4 and 5, each sleeve member 12 has a substantially square cross-sectional configuration, as considered within a horizontal plane, through which a substantially square-shaped passage 13 is defined for accommodating suitable fasteners, not shown, and adjacent sleeve members 12 are integrally connected together at diagonally opposite corner regions thereof by means of upper bridge members 14 and lower bridge members 16. Accordingly, a side wall portion of a first sleeve member 12 is disposed at an angle of approximately 90° with respect to a side wall portion of a second adjacent sleeve member 12 as is illustrated within FIG. 5. It is noted that the fastener collation strip 10 is substantially symmetrical about both horizontally and vertically oriented axes 18,20, as illustrated in FIG. 2, and in this manner, the fastener collation strip 10 may be properly utilized within a magazine section of a fastener-driving tool regardless of whether or not the fastener collation strip 10 is effectively rotated 180° around each one of the axes 18,20 such that what was formerly the front face of the fastener collation strip 10 is now the rear face thereof, and what was formerly the upper end of the fastener collation strip 10 is now the lower end of the fastener collation strip 10.

Figure 5:
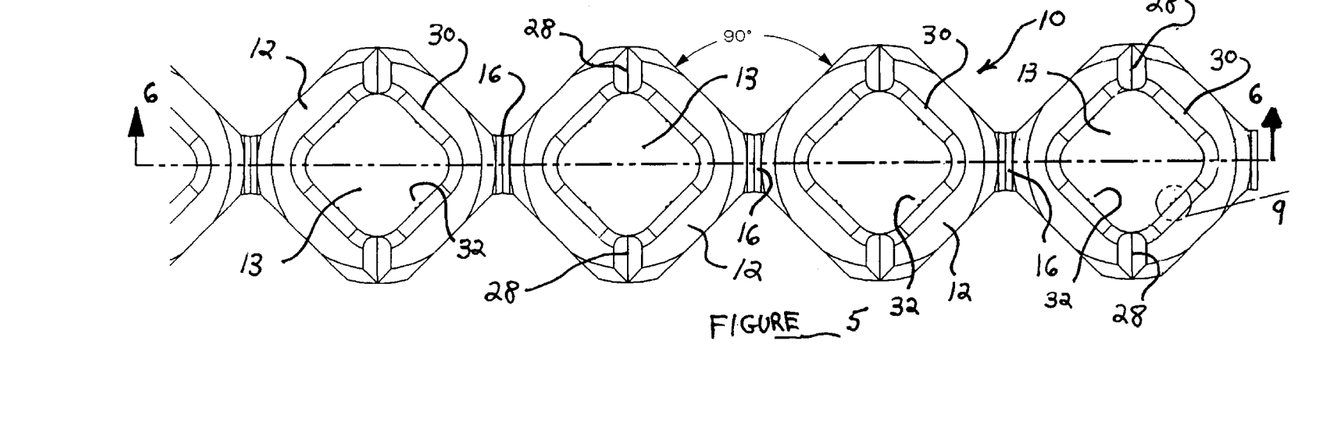
FIG. 5 is a partial, bottom plan view of the new and improved fastener collation strip as illustrated within FIG. 3.
Figure 6:
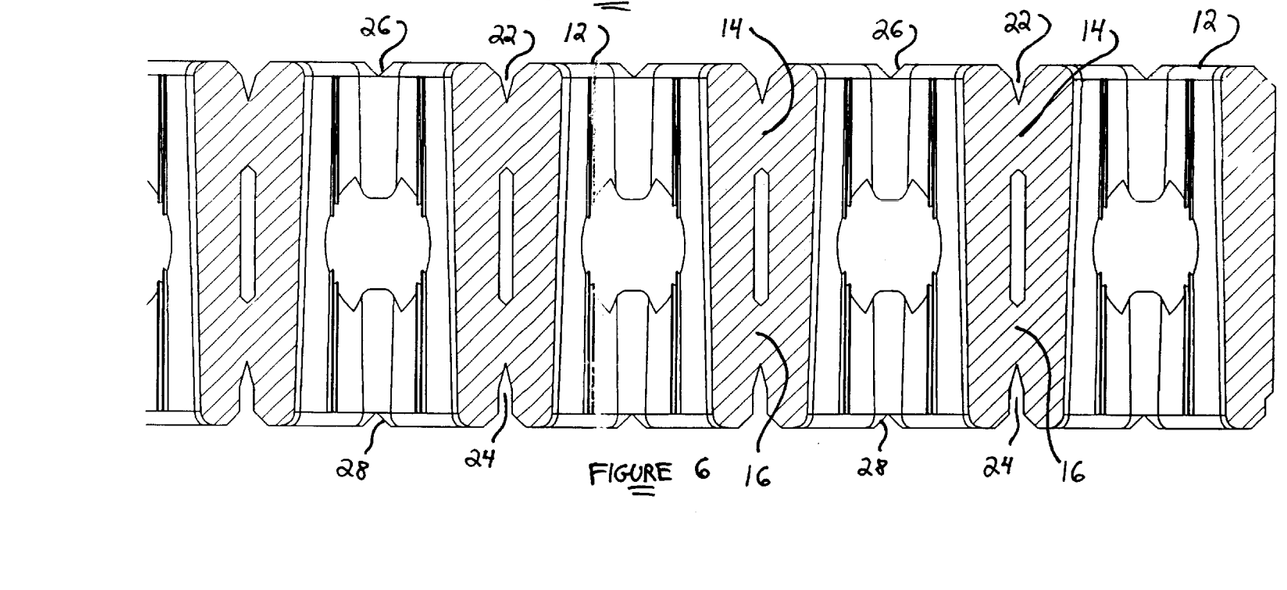
FIG. 6 is a cross-sectional view of the new and improved fastener collation strip as illustrated within FIG. 5 and as taken along the lines 6—6 of FIG. 5.
Figure 9:
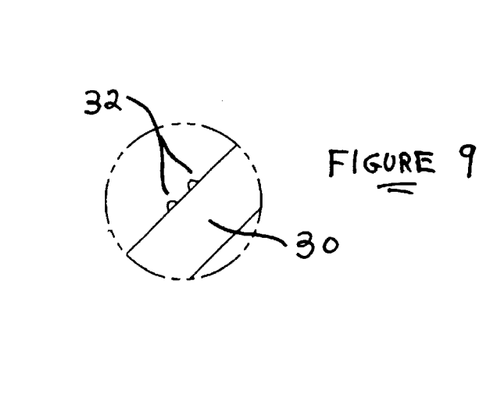
FIG. 9 is an enlarged detailed view of the circled area 9 of FIG. 5 illustrating the crush ribs disposed upon the interior peripheral surface portions of each one of the fastener collation strip sleeve members.

Accordingly, regardless of the particular orientation of the fastener collation strip 10, upper and lower ends of the upper and lower bridge members 14,16 have substantially V-shaped notches or slots 22,24 respectively formed therein, each one of the notches or slots 22,24 subtending an angle of approximately 30°, and in this manner, the severance and separation of each individual one of the sleeve members 12 from the remaining sleeve members 12 forming the fastener collation strip 10, by means of the driver blade assembly of the fastener-driving tool when the particular one of the sleeve members 12 becomes the leading sleeve member 12 and is disposed within the drive bore of the fastener-driving tool, is always facilitated. In a similar manner, the upper and lower wall portions of each sleeve member 12 defining the diagonally opposite corner regions, which are not connected to adjacent sleeve members 12, are likewise respectively provided with notched or slotted portions 26,28, wherein each one of the notches or slots 26,28 subtends an angle of approximately 90°, and in this manner, the head portion of each fastener will be able to readily split each sleeve member 12 substantially in half so as to permit the fastener to be properly driven through sleeve member 12 and into the underlying substrate. In view of the fact that the passage 13 defined within each one of the sleeve members 12 for accommodating a fastener has a substantially square-shaped cross-sectional configuration, and in view of the fact that each fastener has a shank portion which has a substantially circular cross-sectional configuration, the shank portion of each fastener will engage each side wall 30 of each sleeve member 12 at a substantially central portion thereof and along a substantially vertically oriented linear locus. In order to accommodate each one of the fasteners, having a predetermined diametrical extent within machined tolerances, within the passage 13 of each sleeve member 12 in a relatively tightly engaged or toleranced manner, it is noted that each one of the interior surface portions of each side wall 30 of each sleeve member 12 is provided with a pair of crush ribs or dimples 32 as is best appreciated from the enlarged detailed view of FIG. 9.

As has been previously noted in connection with the fastener collation strip of Ernst et al. as disclosed within U.S. Pat. No. 5,069,340, fastener collation strips are adapted to be movably supported upon rail members disposed within the magazine section of the fastener-driving tool such that the collation strips and the plurality of fasteners carried thereby can be conveyed toward the nosepiece section of the fastener-driving tool such that the fasteners can be serially discharged from the fastener-driving tool and driven into the underlying substrate by means of the fastener-driving tool driver blade assembly. It has been noted further that it is desirable to ensure that, as the collation strips of fasteners are transported or conveyed through the magazine section of the fastener-driving tool and toward the nosepiece section of the fastener-driving tool, the risk of the collation strips of fasteners being undesirably retarded or "hung-up" within the magazine section of the fastener-driving tool, or of becoming jammed within the drive bore of the fastener-driving tool, be effectively reduced such that the improper and unsuitable discharge of any of the fasteners from the fastener-driving tool, and an undesirably improper insertion of one or more fasteners into the underlying substrate, be effectively prevented.

Accordingly, it is desirable to effectively reduce, as much as possible, the frictional forces generated between the collation strips of fasteners and the rail members of the magazine section of the fastener-driving tool whereby the conveyance or transportation of the collation strips of fasteners through the magazine section of the fastener-driving tool is effectively facilitated or positively enhanced so as to render such conveyance or transportation of the collation strips of fasteners through the magazine section of the fastener-driving tool as smooth as possible. In view of the fact that frictional forces, generated between any two members disposed in contact with each other, are directly proportional to the area of contact defined between the two members disposed in contact with each other, it is desirable to effectively reduce, as much as possible, the contact area defined between the collation strips of fasteners and the rail members of the magazine section of the fastener-driving tool as the collation strips of fasteners are conveyed or transported along the rail members of the magazine section of the fastener-driving tool. In particular, since the smallest possible contact area defined between two members comprises point contact, as opposed to linear or surface contact, then in accordance with the particular principles and teachings of the present invention, the fastener collation strip 10 of the present invention is provided with unique and novel structure whereby point contact is effectively established between the fastener collation strip 10 and the rail members of the magazine section of the fastener-driving tool.

Figure 3:
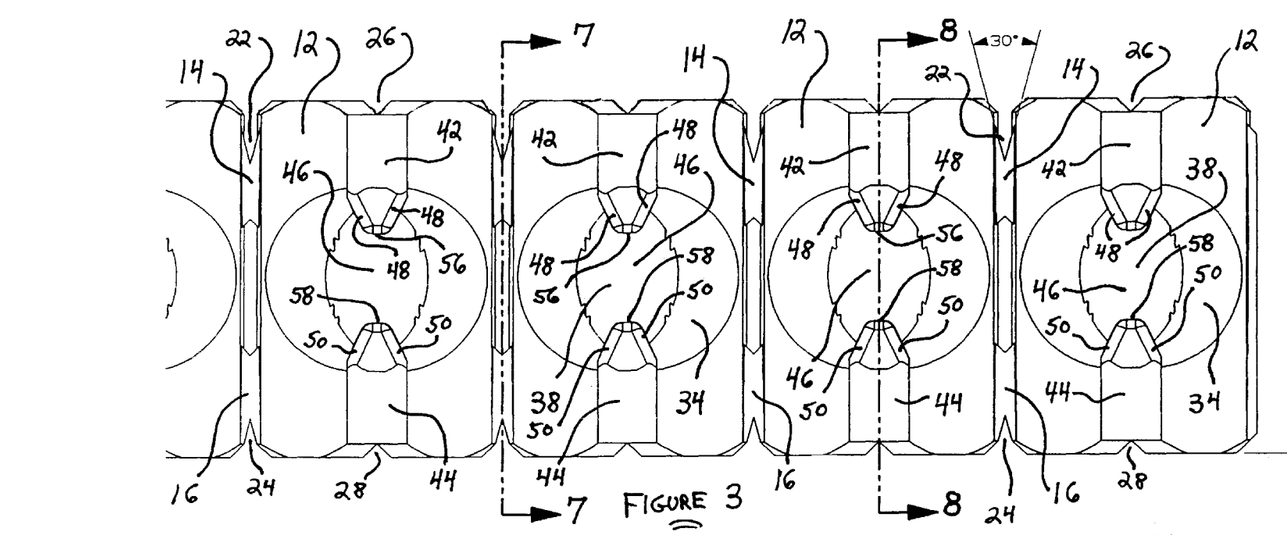
FIG. 3 is a partial, front-elevational view of the new and improved fastener collation strip as illustrated within FIG. 2.
Figure 4:
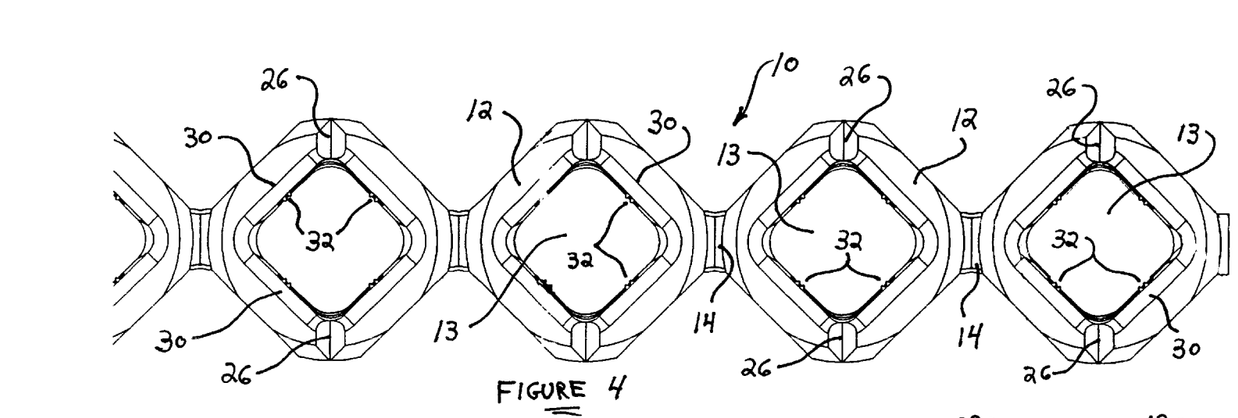
FIG. 4 is a partial, top plan view of the new and improved fastener collation strip as illustrated within FIG. 3.
Figure 7:
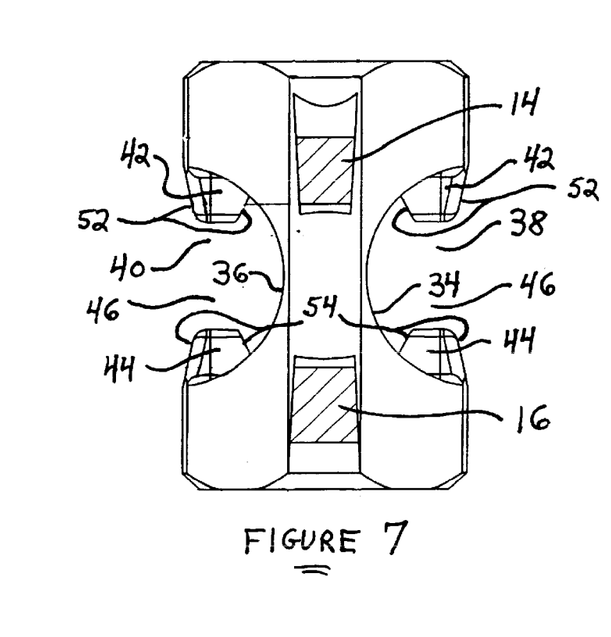
FIG. 7 is a cross-sectional view of the new and improved fastener collation strip as illustrated within FIG. 3 and as taken along the lines 7—7 of FIG. 3.
Figure 8:
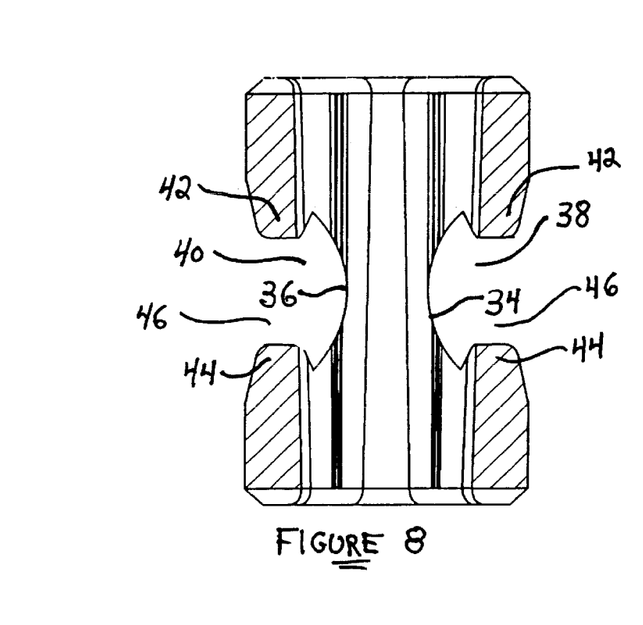
FIG. 8 is a cross-sectional view of the new and improved fastener collation strip as illustrated within FIG. 3 and as taken along the lines 8—8 of FIG. 3.

More particularly, with reference being made to FIGS. 3, 7, and 8, arcuately shaped recesses 34,36 are respectively formed within the forwardly and rearwardly extending corner regions of each sleeve member 12 which are not integrally connected to adjacent sleeve members 12 such that forwardly and rearwardly open windows 38,40, which effectively communicate with the central passages 13 of the sleeve members 12, are respectively formed within vertically centralized regions of each sleeve member 12. As a result of such recessed structure 34,36 and the windowed regions 38, 40, an upper, downwardly extending rail-engaging member or projection 42 is formed upon both the front and rear sides of the fastener collation strip 12, while a lower, upwardly extending rail-engaging member or projection 44 is likewise formed upon both the front and rear sides of the fastener collation strip 12 wherein each one of the lower, upwardly extending rail-engaging members or projections 44 are respectively vertically aligned with the upper, downwardly extending rail-engaging members or projections 42, with spaces 46 being defined therebetween within which the rail members of the fastener-driving tool magazine may be accommodated.

As can be appreciated from FIG. 3, the lower region of each one of the upper, downwardly extending rail-engaging members or projections 42 is defined by means of at least two oppositely disposed sides 48 which converge toward each other within a first plane disposed parallel to the longitudinally extending front and rear faces or sides of the fastener collation strip 10, and in a similar manner, the upper region of each one of the lower, upwardly extending rail-engaging members or projections 44 is defined by means of at least two oppositely disposed sides 50 which also converge toward each other within the first plane disposed parallel to the longitudinally extending front and rear faces or sides of the fastener collation strip 10. As can likewise be appreciated from FIG. 7, the lower region of each one of the upper, downwardly extending rail-engaging members or projections 42 is defined by means of at least two oppositely disposed sides 52 which converge toward each other within a second plane disposed perpendicular to the longitudinally extending front and rear faces or sides of the fastener collation strip 10 and the firstly noted plane, and in a similar manner, the upper region of each one of the lower, upwardly extending rail-engaging members or projections 44 is defined by means of at least two oppositely disposed sides 54 which also converge toward each other within the second plane disposed perpendicular to the longitudinally extending front and rear faces or sides of the fastener collation strip 10 and the firstly noted plane.

Figure 10:
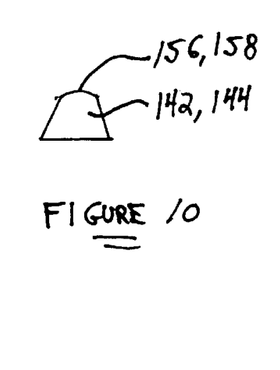
FIG. 10 is a side elevational view of a second conically-configured rail-engaging member or projection.

It will be noted that while, as illustrated within FIGS. 3, 7, and 8, each one of the rail engaging members or projections 42,44 has a substantially pyramidal cross-sectional configuration, each one of the rail engaging members or projections can comprise projections 142,144 which can likewise have a substantially conical cross-sectional configuration as disclosed, for example, in FIG. 10. It is to be noted in conjunction with the disclosure of the projections 142,144 in FIG. 10 that parts of the projections which are similar to the projections 42,44 are denoted by similar reference characters except,they are in the 100 series. In either case, as can be further appreciated, in view of such convergent structure of each rail-engaging member or projection 42,44, or 142,144, as defined within the aforenoted at least two mutually orthogonal planes, the respective tip regions 56,58, or 156,158, of each upper and lower rail-engaging member or projection 42,44, or 142,144, effectively define substantially point-type radiused contact regions for engaging the rail members of the magazine section of the fastener driving tool. In this manner, frictional forces generated between the collation strips of fasteners 10 and the rail members of the magazine section of the fastener-driving tool are effectively reduced as much as possible whereby the conveyance or transportation of the collation strips of fasteners 10 through the magazine section of the fastener-driving tool is effectively facilitated or positively enhanced so as to render such conveyance or transportation of the collation strips of fasteners 10 through the magazine section of the fastener-driving tool as smooth as possible.

Thus, it may be seen that in accordance with the principles and teachings of the present invention, there has been provided a new and improved fastener collation strip which has pairs of vertically aligned rail-engaging members or projections which have convergent sides disposed within at least two mutually orthogonal planes such that lower and upper tip regions of the rail-engaging members or projections define point-contacts by means of which the fastener collation strips are movably supported upon the rail members of the magazine section of the fastener-driving tool. In this manner, frictional forces generated between the collation strips of fasteners and the rail members of the magazine section of the fastener-driving tool are effectively reduced as much as possible whereby the conveyance or transportation of the collation strips of fasteners through the magazine section of the fastener-driving tool is effectively facilitated or positively enhanced so as to render such conveyance or transportation of the collation strips of fasteners through the magazine section of the fastener-driving tool as smooth as possible. Accordingly, any tendency of the fastener collation strips to become retarded, "hung-up", or jammed within the magazine section of the fastener-driving tool is effectively prevented.

Obviously, many variations and modifications of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A fastener-collation strip for transporting a plurality of fasteners along rail members disposed within a magazine section of a fastener-driving tool, comprising:

a plurality of sleeve members for respectively supporting and carrying a plurality of fasteners through a magazine section of a fastener-driving tool such that the plurality of fasteners can be transported toward a drive bore of the fastener-driving tool within which the plurality of fasteners are adapted to be serially and individually driven through the drive bore of the fastener-driving tool by a drive member of the fastener-driving tool so as to be discharged from the fastener-driving tool;

a plurality of frangible bridge members integrally connecting said plurality of sleeve members together in a serial array and facilitating the separation of a leading one of said plurality of sleeve members from remaining ones of said plurality of serially arranged sleeve members when the drive member of the fastener-driving tool impacts a leading one of the plurality of fasteners, disposed within said leading one of said plurality of sleeve members, when said leading one of said plurality of sleeve member is disposed within the drive bore of the fastener-driving tool; and a plurality of projections integrally provided upon each one of said plurality of sleeve members for operatively engaging the rail members of the magazine section of the fastener-driving tool, wherein each one of said plurality of projections defines a substantially point-type radiused contact tip region for engaging a surface portion of one of the rail members of the magazine section of the fastener-driving tool whereby frictional forces generated between each one of said plurality of projections and the surface portion of the rail member, along which each one of said plurality of projections is moved as said fastener-collation strip is moved along the rail members of the magazine section of the fastener-driving tool, are minimized.

2. The fastener-collation strip as set forth in claim 1, wherein:

said substantially point-type radiused contact tip region of each one of said plurality of projections is defined by a pair of oppositely disposed, converging side portions of said projection as disposed within each one of two mutually orthogonal planes.

3. The fastener-collation strip as set forth in claim 2, wherein:

each one of said plurality of projections has a substantially pyramidal geometrical configuration.

4. The fastener-collation strip as set forth in claim 2, wherein:

each one of said plurality of projections has a substantially conical geometrical configuration.

5. The fastener-collation strip as set forth in claim 1, wherein:

said fastener-collation strip, as defined by means of said integrally connected, serially arranged, plurality of sleeve members, comprises a front surface portion and a rear surface portion; and said plurality of projections are disposed upon both said front surface and rear surface portions of said fastener-collation strip.

6. The fastener-collation strip as set forth in claim 5, wherein:

a pair of said plurality of projections are disposed upon each one of said front surface and rear surface portions of said fastener-collation strip.

7. The fastener-collation strip as set forth in claim 6, wherein:

said pair of projections disposed upon each one of said front surface and rear surface portions of said fastener-collation strip are disposed within an aligned, spaced array with respect to each other so as to project toward each other and thereby operatively engage opposite surface portions of each one of the rail members of the magazine section of the fastener-driving tool.

8. The fastener-collation strip as set forth in claim 1, wherein:

each one of said plurality of sleeve members has a substantially square-shaped cross-sectional configuration.

9. The fastener-collation strip as set forth in claim 8, wherein:

each one of said plurality of substantially square-shaped sleeve members is integrally connected to an adjacent one of said plurality of substantially square-shaped sleeve members by said plurality of frangible bridge members which are located along corner regions of said plurality of substantially square-shaped sleeve members which are aligned along first diagonals of said plurality of substantially square-shaped sleeve members.

10. The fastener-collection strip as set forth in claim 9, wherein:

corner regions of said plurality of substantially square-shaped sleeve members, which are aligned along second diagonals of said plurality of substantially square-shaped sleeve members, have notch means formed therein for facilitating the splitting of each one of said sleeve members as the fastener is driven therethrough by the drive member of the fastener-driving tool when the fastener is discharged from the fastener-driving tool.

11. The fastener-collation strip as set forth in claim 8, wherein:

interior surface portions of each one of said plurality of substantially square-shaped sleeve members have crush rib members integrally formed thereon for engaging shank portions of the fasteners disposed within said plurality of sleeve members comprising said fastener-collation strip whereby different fasteners, having different diametrical dimensions, may be carried by said plurality of sleeve members of said fastener-collation strip.

12. In combination with a fastener-driving tool, a fastener-collation strip for transporting a plurality of fasteners along rail members disposed within a magazine section of the fastener-driving tool, comprising:

a fastener-driving tool magazine section comprising rail members leading to a drive bore of said fastener-driving tool within which a drive member of said fastener-driving tool is movably disposed for driving a fastener through the drive bore of said fastener-driving tool so as to discharge the fastener from said fastener-driving tool;

a plurality of sleeve members for respectively supporting and carrying a plurality of fasteners through said magazine section of said fastener-driving tool such that the plurality of fasteners can be transported toward the drive bore of said fastener-driving tool within which the plurality of fasteners are adapted to be serially and individually driven through the drive bore of said fastener-driving tool by the drive member of said fastener-driving tool so as to be discharged from said fastener-driving tool;

a plurality of frangible bridge members integrally connecting said plurality of sleeve members together in a serial array and facilitating the separation of a leading one of said plurality of sleeve members from remaining ones of said plurality of serially arranged sleeve members when the drive member of said fastener-driving tool impacts a leading one of the plurality of fasteners, disposed within said leading one of said plurality of sleeve members, when said leading one of said plurality of sleeve member is disposed within the drive bore of said fastener-driving tool; and a plurality of projections integrally provided upon each one of said plurality of sleeve members for operatively engaging said rail members of said magazine section of said fastener-driving tool, wherein each one of said plurality of projections defines a substantially point-type radiused contact tip region for engaging a surface portion of one of said rail members of said magazine section of said fastener-driving tool whereby frictional forces generated between each one of said plurality of projections and the surface portion of said rail member, along which each one of said plurality of projections is moved as said fastener-collation strip is moved along said rail members of said magazine section of said fastener-driving tool, are minimized.

13. The combination as set forth in claim 12, wherein:

said substantially point-type radiused contact tip region of each one of said plurality of projections is defined by a pair of oppositely disposed, converging side portions of said projection as disposed within each one of two mutually orthogonal planes.

14. The combination as set forth in claim 13, wherein:

each one of said plurality of projections has a substantially pyramidal geometrical configuration.

15. The combination as set forth in claim 13, wherein:

each one of said plurality of projections has a substantially conical geometrical configuration.

16. The combination as set forth in claim 12, wherein:

said fastener-collation strip, as defined by means of said integrally connected, serially arranged, plurality of sleeve members, comprises a front surface portion and a rear surface portion; and said plurality of projections are disposed upon both said front surface and rear surface portions of said fastener-collation strip.

17. The combination as set forth in claim 16, wherein:

a pair of said plurality of projections are disposed upon each one of said front surface and rear surface portions of said fastener-collation strip.

18. The combination as set forth in claim 17, wherein:

said pair of projections disposed upon each one of said front surface and rear surface portions of said fastener-collation strip are disposed within an aligned, spaced array with respect to each other so as to project toward each other and thereby operatively engage opposite surface portions of each one of said rail members of said magazine section of said fastener-driving tool.

19. The combination as set forth in claim 12, wherein:

each one of said plurality of sleeve members has a substantially square-shaped cross-sectional configuration.

20. The combination as set forth in claim 19, wherein:

each one of said plurality of substantially square-shaped sleeve members is integrally connected to an adjacent one of said plurality of substantially square-shaped sleeve members by said plurality of frangible bridge members which are located along corner regions of said plurality of substantially square-shaped sleeve members which are aligned along first diagonals of said plurality of substantially square-shaped sleeve members.

21. The combination as set forth in claim 20, wherein:

corner regions of said plurality of substantially square-shaped sleeve members, which are aligned along second diagonals of said plurality of substantially square-shaped sleeve members, have notch means formed therein for facilitating the splitting of each one of said sleeve members as the fastener is driven therethrough by the drive member of said fastener-driving tool when the fastener is discharged from said fastener-driving tool.

22. The combination as set forth in claim 19, wherein:

interior surface portions of each one of said plurality of substantially square-shaped sleeve members have crush rib members integrally formed thereon for engaging shank portions of the fasteners disposed within said plurality of sleeve members comprising said fastener-collation strip whereby different fasteners, having different diametrical dimensions, may be carried by said plurality of sleeve members of said fastener-collation strip.

* * * * *